United States Patent [19]
Blersch et al.

[11] Patent Number: 4,798,692
[45] Date of Patent: Jan. 17, 1989

[54] METHOD FOR CONTROLLING AND/OR REGULATING THE INJECTION MOLDING IN INJECTION MOLDING MACHINES

[75] Inventors: Eberhard Blersch, Stuttgart; August Burr, Schwäbisch Gmünd; Klaus Hofmann, Waiblingen-Beinstein, all of Fed. Rep. of Germany

[73] Assignee: Robert Bosch GmbH, Stuttgart, Fed. Rep. of Germany

[21] Appl. No.: 857,741

[22] PCT Filed: Jun. 28, 1985

[86] PCT No.: PCT/DE85/00219

§ 371 Date: Mar. 11, 1986

§ 102(e) Date: Mar. 11, 1986

[87] PCT Pub. No.: WO86/00563

PCT Pub. Date: Jan. 30, 1986

[30] Foreign Application Priority Data

Jul. 11, 1984 [DE] Fed. Rep. of Germany ....... 3425459

[51] Int. Cl.$^4$ .............................................. B29C 45/78
[52] U.S. Cl. .............. 264/40.6; 264/328.14; 264/328.16; 264/40.1
[58] Field of Search ................. 264/40.6, 40.1, 328.14, 264/328.15, 328.16, 328.8; 425/144, 136

[56] References Cited

U.S. PATENT DOCUMENTS

| | | | |
|---|---|---|---|
| 4,354,812 | 10/1982 | Wieder et al. | 264/40.6 X |
| 4,420,446 | 12/1983 | Wieder et al. | 264/40.6 |
| 4,480,981 | 11/1984 | Togawa et al. | 425/144 |

FOREIGN PATENT DOCUMENTS

| | | | |
|---|---|---|---|
| 2358911 | 11/1973 | Fed. Rep. of Germany. | |
| 2543088 | 9/1975 | Fed. Rep. of Germany. | |
| 2543447 | 3/1977 | Fed. Rep. of Germany | 425/144 |
| 2462990 | 3/1981 | France | 264/40.6 |
| 0016567 | 2/1977 | Japan | 425/144 |
| 2136114 | 9/1984 | United Kingdom | 264/40.6 |

Primary Examiner—Jan H. Silbaugh
Assistant Examiner—Mary Lynn Fertig
Attorney, Agent, or Firm—Michael J. Striker

[57] ABSTRACT

A method is suggested which is used for controlling and/or regulating of the injection molding in injection molding machines by measuring the temperature in the injection tool. A thermosensor is fed within a bore in the tool very closely to the molding pocket surface, so that the temperature fluctuations resulting from the injection cycles can be registered by the thermosensor. The measuring results are controlled with respect to maximum permissible deviations, whereby it is advantageous to control the minimum temperature and the temperature difference between the maximum and the minimum temperature. When exceeding predetermined maximum permissible deviations a signal is actuated for controlling a quality control for sorting out of parts and/or a light signal or an acoustic signal and/or the machine is switched off. Moreover, the measuring signals are used for controlling of the tool temperature and the mass temperature. Each molding pocket is controlled with respect to a complete filling when using multiple pocket molds.

5 Claims, 1 Drawing Sheet

METHOD FOR CONTROLLING AND/OR REGULATING THE INJECTION MOLDING IN INJECTION MOLDING MACHINES

STATE OF THE ART

The invention is based on a method in accordance with the type of the main claim. A regulation device for injection molding machines is disclosed in DE-OS 23 58 911, wherein the measuring evaluator pick up is disposed directly in the mold pocket surface and comes into contact with the injection molding mass. On the one hand, this results in that only a measuring of quasi-mass or the contact temperature is made possible, while an extra sensor must be installed for the tool temperature. On the other hand, such measuring value pick ups must be constructed in a very robust manner in view of the high pressures in the mold pocket and the extreme mechanical stresses which is disadvantageous in that the sensor is relatively insensitive and leaves a lot to be desired as far as its measuring accurateness is concerned, since it has a relative large time constant due to its structure which results in a lower reaction sensitivity, so that only a very slack regulation is made possible with the assistance of such measuring evaluator pick ups.

A method for regulating an injection molding machine is known from DE-AS No. 25 43 088, wherein the tool temperature is measured, however in this method it is additionally required to use a further thermosensor in a jet intermediary piece in front of the screw tyi, so as to also measure the temperature of the injection molding mass. Such a sensor is subjected to a heavy wear, above all, in fiber reinforced plastics. Furthermore, heat conductivity errors do occur which falsify the actual value of the mass temperature and in addition the expenses are relatively high.

ADVANTAGES OF THE INVENTION

In contrast thereto the method in accordance with the characterizing features of the main claim are advantageous that in addition to the tool temperature the temperature jumps resulting from the injection cycles can be registered, whereby the constancy of the mass temperature can be indirectly measured and/or in multiple pocket molds the filling of the individual molding pockets can be controlled or regulated, as will be shown in the following. Furthermore, the individual mold pockets can be controlled with respect to their complete filling, which simultaneously assures a tool safety. A measuring of the mass temperature in front of the screw tip can be eliminated and in addition the thermosensor is not subjected to a high wear because it does not come directly into contact with the mass. The reaction sensitivity is very high, since the thermosensors have only a very low mass. This high reaction sensitivity enables the measuring of the cyclically occuring temperature jumps with the required exactness.

Further advantages embodiments and improvements of the method stated in the subclaims are made possible in view of the measured stated in the subclaims. It is particularly advantageous if the minimum temperature $T_{min}$ and the temperature difference $\Delta T = T_{max.} - T_{min}$ controls the maximum allowable deviation from the required quality and when exceeding this control a quality control for sorting out parts is actuated and/or the machine is switched off.

DRAWINGS

One exemplified embodiment of the invention is illustrated in the drawing and is explained in more detail in the following description.

DESCRIPTION OF THE EXEMPLIFIED EMBODIMENT

Figure 1:
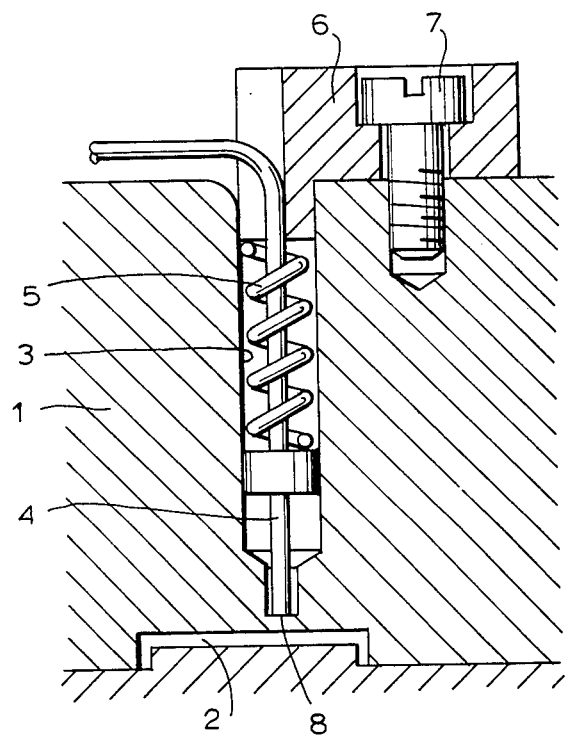
FIG. 1 illustrates the installation of a thermosensor into an injection tool.

FIG. 1 illustrates a part of the tool 1 with a molding pocket 2. The tool 1 is provided with a bore 3 which ends about 1 to 1.5 mm from the surface of the molding pocket 2 and whose latter part is provided with such a cross section that it centers the thermosensor 4. The relative low distance from the mold pocket surface to the thermosensor enables a good heat transmission and assures a high measuring sensitivity of the thermosensor 4. A good contact between the thermosensor 4 and the end of bore 3 is based on the fact that the two contact faces 8 of the thermosensor 4 and the tool 1 are pushed against each other by a pretensioned spring 5, whereby the contact face of tool 1 is flat. This is achieved by a clamping piece 6 which is screwed with a screw 7 in tool 1. The tool 1 which is tempered by means of water and/or oil in a known manner being fed through conduits is part of a customary injection molding machine, whereby this injection molding machine does not have any thermoelement in the proximity of the injection nozzle, as is known from some such machines.

Figure 2:
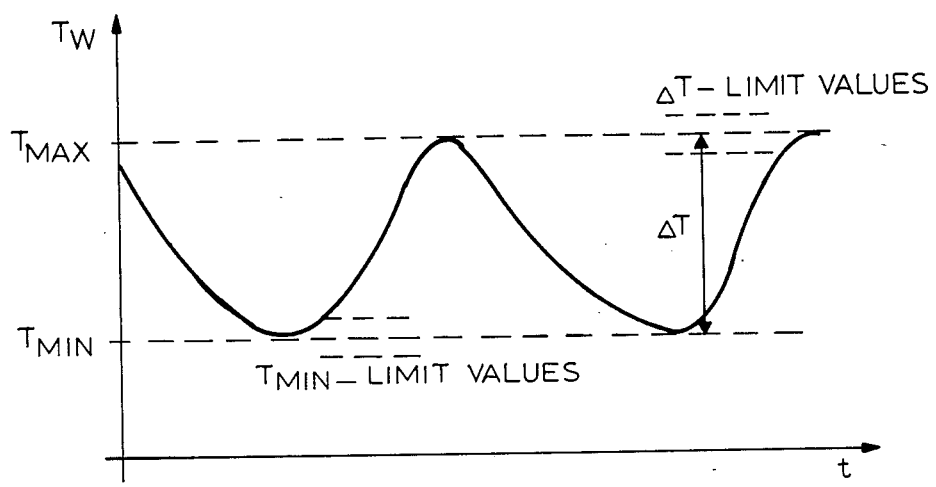
FIG. 2 illustrates in a graphic illustration the curve of the tool temperature in dependency from the time over a plurality of injection cycles

If the thermosensor 4 is connected with a temperature/ chronograph one obtains a curve as depicted in FIG. 2. The curve moves between a minimum and a maximum temperature which in a normal operation remains constant. However, the heating of the tool may fail or, for whatever reason, the temperature of the melt may change upwardly or downwardly which may result in the injected molding parts being made which do not have a maximum quality. In order to have a control over these deviations empirically determined limit values of the deviations upwardly as well as downwardly are established, whereby a quality control is actuated, for example, when these limits are exceeded, so that a fully automated sorting out of such parts occurs which are being made outside of these predetermined limit values, and/or a signal is emitted and/or the machine is turned off.

In order to determine one of the aforementioned errors it is merely required to control the $T_{min}$-values and the $\Delta T$-values, that is, the values $T_{max} - T_{min}$. The following had been found: When the temperature of the tool fails, the temperature $T_{min}$ drops very rapidly by a few degrees, while $\Delta T$ does not change noticeably, which naturally means that the temperature of the melt drops, such a change is only noticeable in the temperature difference $\Delta T$, while $T_{min}$ hardly changes. However, it should be emphasized that $T_{min}$ is measured in whole degrees, while the temperature difference $\Delta T$ is measured in tenth of a degree. If one takes this into consideration these values are very well reproduceable and result in a simple and safe control of the injection operation or may be used as a control dimension.

In the following it will be shown in a specific example in which dimension the temperature or temperature differences move. In this example injected molding parts were made from polyamide 6.6. The tool temperatures were $T_{min}$ of 62.4° C. and $T_{max}$ of 74.5° C.$\Delta T$, hence the difference of these two temperatures is 12.1° C., at a mass temperature of 270° C. Thereafter, the mass temperature had been increased to 290° C. Thereafter, the resulting tool temperatures were $T_{min}$ 63.1° C. and $T_{max}$ of 76.3° C.$\Delta T$ and was 13.2° C. difference in this case, that is, a noticeable increase of $\Delta T$, if one takes into consideration that this dimension is measured in tenth of degree. The time cycle had been 34 seconds, while the distance of the sensor from the tool surface was 1.5 mm.

The height of the temperature jump $\Delta T$ depends from a number of variables, for example, from the positioning and the structure of the thermosensor and also from the mass temperature as shown above and finally from the tool temperature and the material, but also to a lesser degree from the wall thickness of the injection molded part on the location of measuring and from the size of the same. Hence, it is required to empirically determine the limit values for each tool and for the given conditions under which this tool is described. However, if this has been done the inventive method represents a very simple method to control and/or regulate with the same sensor all important parameter, tool temperature and mass temperature which is indirectly picked up with this method.

We claim:

1. A method of controlling and/or regulating an injection molding of a mass through measurement of temperature in an injection molding tool of an injection molding machine, the injecting molding including providing an injection molding tool with a bore, and a mold pocket with a surface, subjecting the tool to a temperature and a mass to be injection molded to a temperature, cyclically injecting the mass into the mold pocket so as to thereby produce temperature jumps in the mold pocket, the method comprising the steps of:

feeding only one thermosensor into the bore of the injection molding tool to a position between 1 mm and 2 mm inclusive from the mold pocket surface;

recording the temperature jumps through the thermosensor so as to produce measurement results;

monitoring the measurement results with respect to predetermined maximum permissible temperature deviations;

using the measuring results to control the mass temperature and the tool temperature, the step of monitoring the measurement results including monitoring a minimum temperature $T_{min}$ and a temperature difference $\Delta T$ with respect to predetermined maximum permissible temperature deviations, the temperature difference representing the temperature jump as recorded through the thermosensor and being the difference between a maximum and the minimum temperatures $T_{max} - T_{min}$, the step of using the measuring results including using the minimum temperature $T_{min}$ to regulate the tool temperature and using the temperature difference $\Delta T$ to regulate the mass temperature; and indicating when a temperature recorded through the thermosensor exceeds the predetermined maximum permissible temperature deviations, the indicating including actuating a signal for controlling quality control or for turning off the machine.

2. A method as defined in claim 1, wherein the indicating includes actuating a light signal and an electrical signal for sorting out parts.

3. A method as defined in claim 1, further comprising:

providing a plurality of mold pockets and a plurality of the thermosensors, each mold pocket being equipped with an associated thermosensor; and controlling a filling of the mold pockets with respect to a temperature difference $\Delta T$ recorded through an associated thermosensor, the temperature difference representing the temperature jump and being a difference between a maximum and a minimum temperature $T_{max} - T_{min}$.

4. A method as defined in claim 1, wherein the step of monitoring further includes monitoring for a change in the temperature difference $\Delta T$ which is indicative of a change in the mass temperature and also includes monitoring for a change in the minimum temperature $T_{min}$ which is indicative of a change in the tool temperature.

5. A method as defined in claim 4, wherein the step of recording includes recording values of the minimum temperature $T_{min}$ in whole degrees and recording values of the temperature difference $\Delta T$ in tenths of degrees.

* * * * *